(12) United States Patent
Bergerhoff

(10) Patent No.: US 7,061,369 B2
(45) Date of Patent: Jun. 13, 2006

(54) METHOD FOR MEASURING DISTANCE BETWEEN TWO OBJECTS AND METHOD FOR CONTROLLING ACCESS TO AN OBJECT OR THE USE THEREOF, IN PARTICULAR ACCESS CONTROL AND DRIVING AUTHORIZATION FOR A MOTOR VEHICLE

(75) Inventor: Nikolas Bergerhoff, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 208 days.

(21) Appl. No.: 10/324,311

(22) Filed: Dec. 20, 2002

(65) Prior Publication Data

US 2003/0090365 A1 May 15, 2003

Related U.S. Application Data

(63) Continuation of application No. PCT/EP01/06784, filed on Jun. 15, 2001.

(30) Foreign Application Priority Data

Jun. 27, 2000 (EP) .................................. 00113600

(51) Int. Cl.
*G05B 19/00* (2006.01)

(52) U.S. Cl. ..................................... 340/5.61; 342/127

(58) Field of Classification Search ............... 340/5.61, 340/426, 10.1; 342/125, 43, 51, 127, 47, 342/129
See application file for complete search history.

(56) References Cited

U.S. PATENT DOCUMENTS

| | | | |
|---|---|---|---|
| 4,757,315 A | 7/1988 | Lichtenberg et al. | ........ 342/125 |
| 5,293,160 A | 3/1994 | Kurozu et al. | ......... 340/825.32 |
| 5,347,280 A * | 9/1994 | Schuermann | ................. 342/42 |
| 5,723,911 A | 3/1998 | Glehr | ......................... 307/10.2 |
| 6,084,530 A * | 7/2000 | Pidwerbetsky et al. | .. 340/10.32 |
| 2002/0008615 A1* | 1/2002 | Heide et al. | ................ 340/426 |

\* cited by examiner

*Primary Examiner*—Michael Horabik
*Assistant Examiner*—Matsuichiro Shimizu
(74) *Attorney, Agent, or Firm*—Baker Botts L.L.P.

(57) ABSTRACT

A bidirectional dialogue is carried out between a portable code emitter (15) and a base station (1) for access to a motor vehicle. Both signals are correlated with each other and the dialogue repeated at an altered carrier frequency. The distance of the code emitter (15) from the base station (11) is determined from the difference in two phase difference measurements between the sent and received signal in one station (11 or 15). Access to, or use of the motor vehicle (10) is only permitted when the code emitter (15) is within a certain distance from the motor vehicle (10).

11 Claims, 2 Drawing Sheets

FIG 2

Emitter

Selectable:
$f_A = 433{,}05$ MHz
$f_B = 434{,}79$ MHz $f_{1A} = 54{,}1313$ MHz
$f_{1B} = 54{,}3488$ MHz Measurement: $\Delta\varphi$

Vehicle

54,1313 MHz
54,3488 MHz 2,0049 MHz
2,0129 MHz 125,3038 kHz
125,8073 kHz

METHOD FOR MEASURING DISTANCE BETWEEN TWO OBJECTS AND METHOD FOR CONTROLLING ACCESS TO AN OBJECT OR THE USE THEREOF, IN PARTICULAR ACCESS CONTROL AND DRIVING AUTHORIZATION FOR A MOTOR VEHICLE

CROSS REFERENCE TO RELATED APPLICATION

This application is a continuation of copending International Application No. PCT/EP01/06784 filed Jun. 15, 2001, which designates the United States, and claims priority to European Patent Application Number 00113600.1 filed Jun. 27. 2000.

BACKGROUND OF THE INVENTION

The invention relates to a method for measuring distance between two objects using electromagnetic waves. The invention also relates to a method for controlling access to an object or a use of an object, in which methods measures are taken to prevent unauthorized use of or access to the object. The invention also relates to an access control and driving authorization device for a motor vehicle.

Access control systems, immobilizer systems or other control systems whose function is enabled or controlled only when there is confirmed authorization of a code emitter 15, for example in the form of a smart card or an electronic key, which is interrogated in a wire-free fashion, are known for motor vehicles (U.S. Pat. No. 5,293,160). Usually, for this purpose at least one base station with a transceiver unit for controlling access or the use of the vehicle is arranged on or in the motor vehicle.

In reaction to a triggering event, for example the activation of a door handle, of an ignition starter switch or the like, an interrogation code signal is emitted at regular or irregular intervals and receives a response in the form of a response code signal from an authorized code emitter which is carried by the user (this is also referred to as an interrogation/response dialog).

The base station checks the received response code signal for its authorization, for example by comparing an item of code information contained in the response code signal with a stored item of reference code information. In the case of authorization, the desired function, such as unlocking of the vehicle door locks or the release of the immobilizer, is carried out.

In such a system, security problems may arise, for example owing to unauthorized interception and manipulation of the wire-free communication between the motor vehicle and code emitter. In addition, code emitters which are too far away could permit access to the motor vehicle. For this reason, in the known access control system the transient time of the signals is measured. This transient time measurement is used to calculate the distance between the code emitter and the base station. Only if the distance is within a predetermined range can the code emitter control the access or the use by means of its response signal.

As the signal transient times are relatively short in free space in comparison with the calculation times which are required at the code emitter to generate the response code signal, a transient time measurement has considerable tolerance problems.

The patent U.S. Pat. No. 4,757,315 has disclosed a method and a device for measuring a distance, in which method and device a station emits a first signal with a frequency $f_1$ and in response a transponder transmits back a second signal, with a frequency $f_2$, which is generated passively from the first signal with the frequency $f_1$. The station receives this signal and determines the distance between the station and transponder from the phase difference between the two signals.

The patent U.S. Pat. No. 5,723,911 discloses a method for keyless access control, which uses a measurement of the distance between a motor vehicle and a transceiver to prevent unauthorized access.

SUMMARY OF THE INVENTION

The invention is based on the object of providing a method for measuring a distance between two objects, for controlling access to an object or a use of an object and an access control and driving authorization device for a motor vehicle with which the distance between two objects, in particular between a code emitter and base station can be determined as accurately as possible.

This object is achieved according to the invention by means of a method having the features as claimed in patent claim 1, by means of a method having the features as claimed in patent claim 6 and by means of an access control and driving authorization device having the features as claimed in claim 12.

Here, a first signal and a second signal, in particular an interrogation signal of a base station and a response signal of a portable code emitter (15), are emitted twice at different carrier frequencies. The carrier frequencies are correlated here, i.e. they are dependent on one another.

Advantageous refinements of the invention are described in the subclaims. For example, the signals can each be transmitted and received simultaneously. The carrier frequencies are correlated with one another and can be approximated to one another by means of frequency shifting so that a phase shift between the signals can be measured. The distance of the code emitter 15 to the base station is determined from this phase shift. If this distance lies within a predetermined limiting value, the response signal with its code information contained in it is evaluated.

As the signals are emitted at different carrier frequencies, interception of the signals by unauthorized persons is advantageously made difficult. In addition, the distance between the code emitter and base station can easily be determined in a reliable way and this is the case even when there are different ambient conditions such as different temperatures.

BRIEF DESCRIPTION OF THE DRAWINGS

Exemplary embodiments of the invention are explained in more detail below with reference to the schematic drawings, in which:

FIG. 2 shows a block circuit diagram of the access control and driving authorization device according to FIG. 1.

DETAILED DESCRIPTION OF THE PREFERRED EMBODIMENTS

Figure 1:
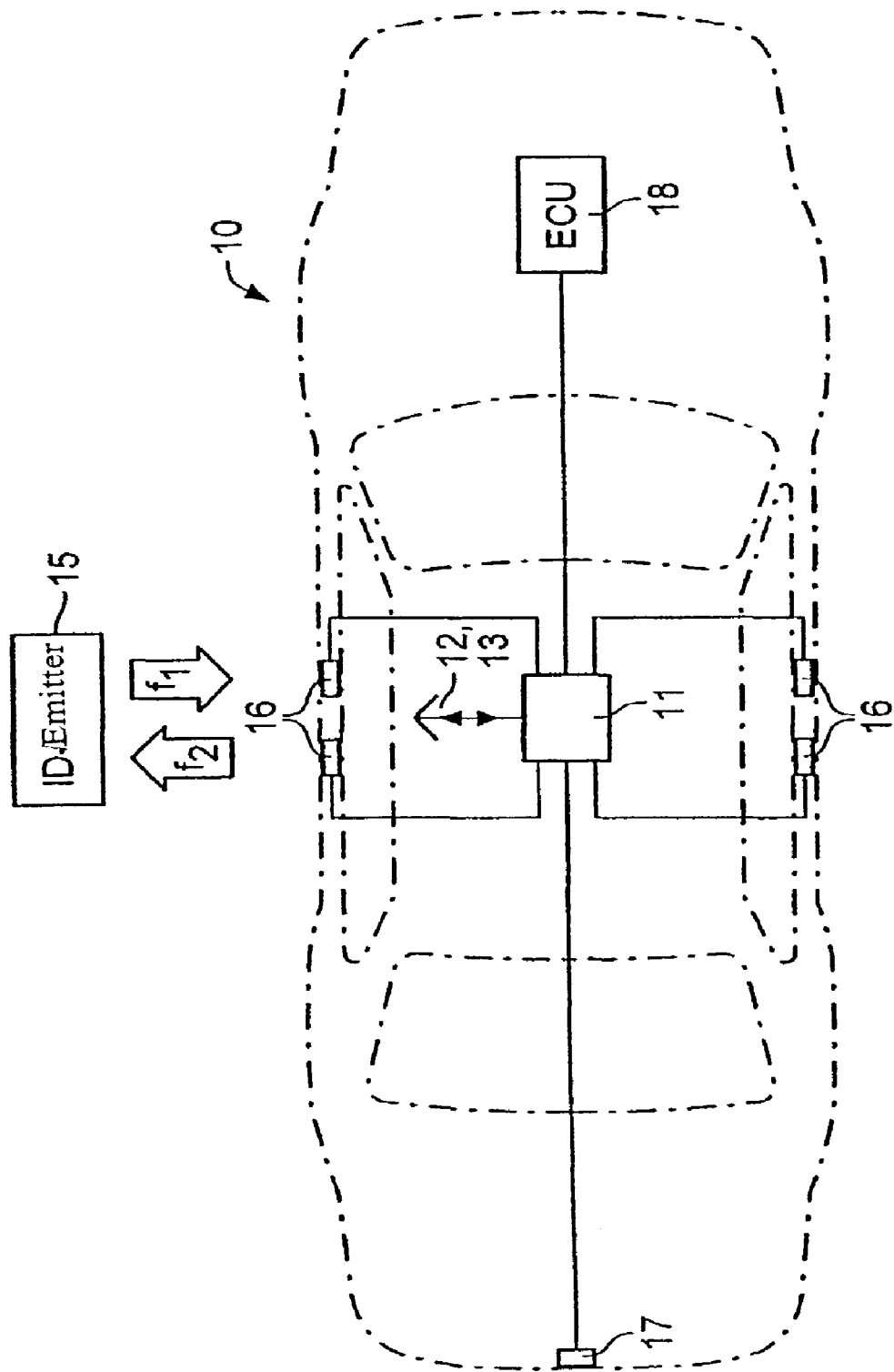
FIG. 1 shows a schematic design of an access control and driving authorization device for a motor vehicle.

A method for measuring distance between a first object and a second object using electromagnetic waves will be explained in more detail by means of the specific example of a method for controlling access to an object or the use of an object, specifically in particular by means of the example of an access control to a motor vehicle. Therefore, essentially an access control device and a driving authorization device for a motor vehicle are described, together with a method for controlling access and the use of the motor vehicle. Of course, this method can also be used with other objects, for example closed-off areas such as security areas, doors of a building, garages or car parks.

The method described for measuring distance between two objects using electromagnetic waves is generally suitable for determining distances between two objects, for example a satellite and a base station on the ground, between two vehicles etc.

The access control and driving authorization device for a motor vehicle 1 (FIG. 1) has a base station 11 which is arranged in or on the motor vehicle 10. This base station 11 has a transmitter unit and a receiver unit with one or more antennas 12, 13. The base station 11 can emit an interrogation signal as an electromagnetic wave at the user's request and receive a response signal from a portable code emitter 15.

The base station 11 is connected to the door locks 16, the tailgate lock 17, fuel tank cover lock etc., and controls the latter in the sense of unlocking or locking if authorization to do this is confirmed using the portable code emitter 15. Furthermore, the base station 11 is connected to a controller 18 (ECU), in particular the engine controller or ignition controller. The internal combustion engine can be started and the motor vehicle 10 driven only if this controller 18 functions correctly. This function is enabled when authorization is confirmed (i.e. the immobilizer is released). Otherwise, the use of the motor vehicle 10 is disabled (immobilizer not released).

The portable code emitter 15 has transmitters and receivers which are not explicitly illustrated. If the receiver receives an interrogation signal, it subsequently generates a response signal and automatically emits it (for this reason such code emitters 15 are also referred to as transponders). If the response signal is received by the base station 11, it is evaluated for authorization. Given authorization, locks 16, 17 of the motor vehicle 10 are locked or unlocked and an immobilizer is released. The access or the use of the motor vehicle 10 is therefore enabled.

The interrogation signal and the response signal can be emitted at different carrier frequencies or at the same carrier frequencies. In the example shown, the carrier frequencies are different ($f_1$ and $f_2$). In addition, a renewed interrogation/response dialog is started during which the carrier frequencies are altered with respect to the first interrogation/response dialog.

If the two carrier signals are correlated to one another, the signal transient time, and thus the distance between the two objects which are the base station and code emitter can be measured using the correlation, by shifting the phase or frequency of the two signals. In this way, it is then advantageously possible to bring about a situation in which a code emitter 15 enables the access or the use only if said code emitter 15 is in the vicinity of the motor vehicle 10.

In this method, an oscillator 20 (FIG. 2) with a switchable frequency in the code emitter 15 or an oscillator in the base station 11 controls the entire procedure. The carrier oscillation which is emitted by this oscillator 20 (also referred to as frequency emitter) controls the oscillation of the carrier oscillation which is generated by the other unit. In this way, the frequency of the controlled carrier oscillation is a function of the frequency of the controlling carrier oscillation (i.e. the controlled carrier oscillation is dependent on the controlling carrier oscillation):

$$f_2 = u(f_1)$$

The two carrier signals are correlated by means of this dependence.

The method according to the invention for measuring distance between two objects uses two measurements in order to determine the distance between the code emitter 15 and base station 11 in the present exemplary embodiment. The measurements are carried out at in each case at a different frequency of the controlling carrier oscillation.

Firstly, the controlling unit (in the exemplary embodiment illustrated in FIG. 2 this is the code emitter 15) transmits at a frequency $f_1 = f_A$. At the same time, it receives the carrier signal which has been transmitted by the controlled unit (in the exemplary embodiment in FIG. 2 this is the base station 11) and which has the frequency $f_2 = u(f_1) = u(f_A)$ and compares it with the self-generated local signal.

In order to be able to carry out a comparison, the carrier frequencies of the local signal and of the received signal are firstly adapted to one another. This is necessary as both units transmit at different carrier frequencies $f_1$ and $f_2$. The adaptation is carried out in that the frequency of the received and/or locally generated signal is raised and/or lowered using a frequency correction unit (not explicitly illustrated). The phase difference between the two signals is then measured.

A phase shift occurs as a function of the distance between the code emitter 15 and the base station 11. However, it is not yet possible to determine the actual distance from this first measurement. This is due to the fact that the transient times in the individual electronic modules in both units, and the associated phase shift, are unknown, and are also dependent on additional parameters such as the ambient temperature. Moreover, it is also not possible to determine the absolute distance owing to the periodicity of the signal.

However, this is made possible by means of a second measurement at an altered carrier frequency $f_1 = f_B$. For this purpose, the frequency in the local oscillator 20 is altered to the frequency $f_B$ and a signal which is transmitted back in a correlated fashion in the other unit is emitted. The phase shift is measured again by comparing the local frequency with the received frequency.

If the frequency is increased, a larger phase shift or phase difference then occurs than in the first measurement. This is due to the fact that a signal with a higher frequency passes through more periods, or is further advanced in its phase, than a signal with a low frequency, during the same signal transient time. The absolute distance can then be determined from the difference between the first and second measured phase shifts. The unknown transient times in the electronic modules virtually cancel one another out as a result of the formation of differences (apart from frequency-dependent elements).

FIG. 2 illustrates the method using a specific example. The code emitter 15 (also referred to as ID emitter) has the adjustable oscillator 20. This oscillator 20 can generate at least two oscillations with the carrier frequencies $f_A$ and $f_B$. The oscillations are fed on the one hand to a transmitter antenna 21 and on the other hand to a divider 22. The oscillation which is fed to the divider 22 is referred to as "local" oscillation with the "local" frequency as it is used only for comparing phases with the received oscillation at the code emitter 15. For this purpose, the divider 22 feeds the carrier frequency with a divided frequency to a phase detector 23.

The code emitter 15 has, as input, a receiver antenna 24 in the form of a coil which is connected to a phase locked loop 25. The phase locked loop 25 has a phase detector 26, a VCO oscillator 27 and a further divider 28. The output of the phase locked loop 25 is fed to the first phase detector 23. In this way, the phase detector 23 receives the local signal and the received signal which has been conditioned by the phase locked loop. The measured phase difference Δϕ between the emitted signal and the received signal appears at the output of the first phase detector 23.

A divider stage 31, 32, 33, 34 with the modulo dividers 31 and 32, whose input is connected to a receiver antenna 13, is arranged in the base station 11. The output of the divider 32 is fed to a shift register 33 as a further divider, which shift register 33 itself controls a transmitter antenna 12 (embodied here as a coil) via a resistance network 34 as further divider and an amplifier stage 35. In this exemplary embodiment, the oscillator 20 of the code emitter 15 is the controlling unit which predefines and alters the carrier frequency. In the base station 11, the frequency is merely divided. This results in a correlation between the frequencies, and the carrier frequencies of the interrogation signal and response signal are dependent on one another.

In this exemplary embodiment, the code emitter 15 transmits at a carrier frequency of approximately 433 MHz. The base station 11 with its dividers is then configured in such a way that, for its part, it transmits at carrier frequencies of approximately 125 kHz.

The oscillator 20 of the code emitter 15 firstly generates a signal with a carrier frequency $f_1=f_A=433.05$ Mz. This signal is received and digitized by the base station 11 and its frequency divided by the divider stage 31–34.

In the divider stage 31–34, the frequency is reduced to 54.1313 MHz by a modulo-8-divider (divider 31). The code emitter 15 also has a modulo-8-divider (divider 22) so that a 54.1313 MHz oscillation is also available there.

In the divider stage 31–34 of the base station 11, the frequency of the oscillation is also divided to 2.0049 MHz by a modulo-27-divider (divider 32). An 8-bit shift register 33 at whose outputs there is a resistance network 34 which maps eight points of a sinusoidal half-wave is then actuated using this signal. By means of filters (not illustrated), this digital sinusoidal signal is fed to a push-pull amplifier 35 which drives the transmitter antenna 12.

Overall, the shift register 33 and the resistance network 34 reduce the frequency by the factor 16. The base station 11 therefore transmits at a carrier frequency of $f_2=125.3038$ kHz. As the signal which is emitted at approximately 125 kHz by the base station 11 is correlated (due to the frequency division) to the signal which is emitted at approximately 433 MHz by the code emitter 15, the carrier frequency of the signal of the base station 11 follows every fluctuation in the frequency of the signal of the code emitter 15.

In the code emitter 15, the 125.3038 kHz signal which is transmitted by the base station 11 is then received and its frequency is increased by the phase locked loop 25 by the factor 27×16=432. The frequency is thus 54.1313 MHz at the output of the phase locked loop 25 and can then be compared with the local signal which was divided to the same frequency by the modulo-8 divider 22. Both signals are fed to the first phase detector 23 which, in the simplest case, is a high-speed XOR gate. After filtering, a voltage which is directly proportional to the phase shift or phase difference ΔϕA of the two carrier signals is obtained at the output of the first phase detector 23.

For a second measurement, the oscillator 20 of the code emitter 15 generates a signal with the carrier frequency $f_1=f_B=434.79$ MHz. This leads, in a way analogous to the previously described correlation and frequency division in the base station 11, to a carrier oscillation with the carrier frequency of $f_2=125.8073$ kHz, which is transmitted to the base station 11 for the code emitter 15. The remaining intermediate frequencies in the base station 11 are produced as illustrated in FIG. 2 (second row of values). The phase difference $\Delta\phi_B$ is then obtained as the phase difference between the oscillation received by the code emitter 15 and the local oscillation.

The change Δϕ in the phase shift, that is to say the difference between the two phase difference measurements can then be calculated from the two measurements:

$$\Delta\phi=\Delta\phi_B-\Delta\phi_A$$

The value of the change Δϕ in the phase difference reflects the distance between the code emitter 15 and the base station 11. This will be explained in more detail below using a calculation example.

1. In a first example, it will be assumed that the distance d between the code emitter 15 and base station 11 is d=1 m.

In the first measurement A, the following carrier frequencies are present:

The transmission by the code emitter 15 takes place at the frequency $f_1=f_A=433.05$ MHz.

The base station 11 transmits, under the previously stated division conditions, at a frequency of $f_2=125.3038$ kHz The signal transient time τ (in air) is:

$$\tau = \frac{2 \cdot d}{c} = \frac{2 \cdot 1 \text{ m}}{300 \cdot 10^6 \text{ ms}^{-1}} = 6.7 \text{ ns}$$

(where c=speed of light and d=distance)

This results in a measurable phase difference $\Delta\phi_A$ in the first measurement A of:

$$\Delta\varphi_A = 360° \cdot \frac{\tau}{T_{IA}} + \alpha_0; \quad T_{IA} = \frac{1}{f_{IA}}$$

$$\Delta\phi_A = 129.9158° + \alpha_0;$$

(where $T_i$=respective period duration of an oscillation).

Here, the term $\alpha_0$ stands for the unknown phase shift owing to the signal transient times in the electronic components in the code emitter 15 and in the base station 11.

In the second measurement B, the following frequencies are obtained:

The code emitter 15 transmits at the frequency $f_1=f_B=434.79$ MHz

The base station 11 transmits, under the given division conditions, at a frequency of $f_2=125.8073$ kHz The signal transient time is, as before:

$$\tau = \frac{2 \cdot d}{c} = \frac{2 \cdot 1 \text{ m}}{300 \cdot 10^6 \text{ ms}^{-1}} = 6.7 \text{ ns}$$

This results in a measurable phase difference $\Delta\phi_B$ of:

$$\Delta\varphi_A = 360° \cdot \frac{\tau}{T_{IB}} + \alpha_0; \; T_{IA} = \frac{1}{f_{IB}}$$

$\Delta\phi_A = 130.4378° + \alpha_0;$

The change in the phase shift $\Delta\phi$ is thus:

$\Delta\phi = \Delta\phi_B - \Delta\phi_A = 0.5220°$

2. In the second example, it will be assumed that the distance d between the code emitter 15 and base station 11 is d=10 m.

Measurement A:

$f_1 = f_A = 433.05$ MHz $\Rightarrow f_2 = 125.3038$ kHz

The signal transient time (in air) is then:

$$\tau = \frac{2 \cdot d}{c} = \frac{2 \cdot 10 \text{ m}}{300 \cdot 10^6 \text{ ms}^{-1}} = 66.7 \text{ ns}$$

This results in a measurable phase shift $\Delta\phi A$ of:

$$\Delta\varphi_A = 360° \cdot \frac{\tau}{T_{IA}} + \alpha_0; \; T_{IA} = \frac{1}{f_{IA}}$$

$\Delta\phi_A = 1299.158° + \alpha_0;$ or $\Delta\phi_A = 219.1577° + \alpha_0;$ respectively, because of periodicity Measurement B:

$f_1 = f_A = 434.79$ MHz $\Rightarrow f_2 = 125.8073$ kHz

The signal transient time will be assumed again to be 66.7 ns. This results in a measurable phase shift $\Delta\phi_B$ of:

$$\Delta\varphi_B = 360° \cdot \frac{\tau}{T_{IB}} + \alpha_0; \; T_{IB} = \frac{1}{f_{IB}}$$

$\Delta\phi_B = 1304.3777° + \alpha_0;$ or $\Delta\phi_B = 224.3777° + \alpha_0;$ respectively, because of periodicity The change in the phase shift is thus ten times as large as in the case of a distance of only 1 m:

$\Delta\phi = \Delta\phi_B - \Delta\phi_A = 5,2200°$

The frequency range around 433 MHz is approved for professional applications in the field of motor vehicle technology in Germany and in Europe. At this frequency, a transmitter must only be operated in a very narrow band, specifically between 433.05 MHz to 434.79 MHz. Owing to this narrow band width, the code emitter 15 is operated as a controlling unit as, conversely, a small change in the frequency at the base station end would result in a very large change in the frequency at 433 MHz. The carrier frequency will then leave the officially approved band limits. Without these official legal restrictions, the controlling unit, i.e. the oscillator 20 which adjusts itself, could be arranged either in the code emitter 15 or in the base station 11.

In the example given above, a phase resolution of 5° is sufficient for a distance resolution of 10 meters. An XOR gate as phase detector 23 generates, given, for example, a 3-volt supply voltage, an average output voltage of 0 volts with 0° phase shift, 1.5 volts with 90° phase shift and 3.0 volts with 180° phase shift. An output voltage of 83 mV is obtained with a 5° phase shift. With a subsequent 8-bit A/D converter as evaluation unit for the phase difference, a resolution of 12 mV is obtained with a 3-volt supply voltage. This corresponds to a 0.7° phase shift. If irregularities in the signal transient time in the counters are disregarded, the required resolution of 5° seems quite realistic.

The evaluation is performed here by a microprocessor (not illustrated) which determines the corresponding phase from the detected voltage of the phase detector 23. The microprocessor can have an internal A/D converter here. The output of the phase detector 23, and thus the supply to the microprocessor, is illustrated schematically in FIG. 2 by means of a resistor and a capacitor to ground. The signals at the output of the phase detector 23 are measured and evaluated.

The precision of the distance measurement is determined primarily by the available bandwidth $B = f_B - f_A$ because larger frequency differences give rise to larger phase difference changes which are easier to measure. The measuring accuracy can however also be influenced by means of the period of time for which the signals are switched on. Basically, it is appropriate to switch the signals on until all the electronic modules are in the steady state.

In practice, the problem arises that all the electronic modules are subject to tolerances. In particular, the response thresholds of the electronic switches fluctuate continuously so that the generated signals, and thus also the values of the phase difference measurement, can only be described as a stochastic process. The fluctuations in the response thresholds can be described by means of a normal distribution which has the predefined response threshold as the mean value. By connecting a plurality of switches in series, as is the case for example as a result of connecting the frequency dividers 31, 32 in series, a normal distribution with a relatively high degree of variation around the mean value (the durations of the individual normal distributions of each stage are added together).

In the method described by FIG. 2, this is apparent through jittering of the output signal downstream of the phase detector (referred to as phase jitter). However, for the distance calculation only the mean value of the measurement results is of interest. For this reason, a low-pass filter (not illustrated) which functions as a mean-value former is arranged downstream of the phase detector 23.

The lower the limiting frequency of the low-pass filter is selected, the longer the period for which the signal has to be switched on, and the more precise is the mean value formation, and thus also the precision of the distance calculation. In practice, this means that if only a small bandwidth is available (for example owing to officially determined conditions), output measuring precision can be achieved through switching signals on and off for a longer period with a correspondingly configured low-pass filter.

For the application example calculated above, it is also possible to specify the maximum distance which can be unambiguously measured. The speed of the transmitted signals may never be greater than the speed of light c in a vacuum, regardless of the medium over which a signal is transmitted. The maximum evaluable change in the phase shift $\Delta\phi$ is 180°. For transmission at the speed of light c at the given carrier frequency $f_1$ this corresponds to a distance of 383 meters. Given larger distances, the measured phase shift decreases again and ultimately reaches the value 0 again at 766 meters. Above 766 meters, it increases again etc. To the access control device, a distance of, for example, 776 meters would thus appear to be exactly the same as a distance of 10 meters.

Only if the code emitter 15 is located with a previously predefined and specified region around the motor vehicle 10, and there is also authorization through confirmation of a correct code information item, can the access be enabled and/or the motor vehicle 10 started (release of the immobilizer).

Code information items which are used to confirm authorization are usually modulated onto the carrier signals. A separate interrogation/response dialog can also take place in the invention, said dialog confirming only the authorization while the distance determination (location determination) of the code emitter 15 is performed when there are two interrogation/response dialogs taking place previously or afterwards.

So that the checking of the authorization can take place as quickly as possible and, as far as possible unnoticed by the user, a common interrogation/response dialog (with checking of the authorization) with simultaneous distance measurement is preferably used.

The interrogation signal can be transmitted before the response signal. The two signals can also be transmitted largely simultaneously (and thus also be received at the same time).

It is also possible to transmit a first signal to the code emitter 15 which then triggers the first carrier oscillation for the distance measurement, after which the base station 11 starts with a first correlated carrier oscillation which is then used for the first phase difference measurement. The second bidirectional communication for the second phase difference measurement then takes place. The code information can be modulated on one of the two signals which is transmitted by the code emitter 15 to the base station 11.

If the change $\Delta\phi$ in the phase difference, and thus the distance between the code emitter 15 and base station 11, is determined at the code emitter 15, this information is communicated to the base station 11 so that it can decide whether an access or a use can also be started. It is also possible for this decision to be taken in the code emitter 15 which, given an invalid distance (for example if the code emitter 15 is too far away from the motor vehicle 10) does not respond with a valid response signal.

For the invention, the external shape of the code emitter 15 is irrelevant. The code emitter 15 can be arranged with its components on a chip card (referred to as smart card), a conventional key grip or some in other suitable casing.

The carrier frequencies $f_1$ and $f_2$ are also selected only by way of example. The method according to the invention of course also functions at all other frequencies of the entire frequency spectrum of electromagnetic waves.

The invention claimed is:

1. A method for measuring distance between a first object and a second object using electromagnetic waves, said method comprising:
   emitting a first signal as an electromagnetic wave with a first carrier frequency from a first transceiver unit in the first object, and
   emitting a second signal as an electromagnetic wave with a second carrier frequency from a second transceiver unit in the second object,
   wherein the first carrier frequency of the electromagnetic wave and the second carrier frequency of the electromagnetic wave are correlated such that the first carrier frequency is actively generated as a function of the second carrier frequency, or conversely the second carrier frequency is actively generated as a function of the first carrier frequency, wherein the measuring accuracy is increased by means of repeated measurement at different carrier frequencies by calculating the difference between at least two measurement results from phase difference measurements or frequency difference measurements.

2. The method as claimed in claim 1, wherein the first transceiver unit and the second transceiver unit each transmit and receive simultaneously.

3. The method as claimed in claim 1, wherein a frequency correction which result in an increase and/or decrease in the carrier frequencies of the signals which are received or generated by the transceiver units are performed in the first object and/or in the second object.

4. The method as claimed in claim 1, wherein the distance between the objects is determined by means of a phase difference measurement or frequency difference measurement between the signals received and generated in an object.

5. The method as claimed in claim 4, wherein the measuring accuracy is increased by means of repeated measurement at different carrier frequencies by calculating the difference between at least two measurement results from phase difference measurements or frequency difference measurements.

6. A method for controlling access to an object or a use of the object, said method comprising:
   providing a base station arranged at the object having a transceiver unit which emits an interrogation signal and can receive a response signal, and
   providing a portable code emitter which emits the response signal and whose code information contained in it is checked for authorization in the base station,
   enabling in the base station access to or use of the object when the response signal is authorized, wherein the interrogation signal and the response signal are first emitted at original carrier frequencies, and after reception are emitted once more at later carrier frequencies which are altered with respect to the original carrier frequencies, the original carrier frequency of the interrogation signal and the original carrier frequency of the response signal being correlated such that the original carrier frequency of the response signal is generated actively as a function of the original carrier frequency of the interrogation signal, or conversely the original carrier frequency of the interrogation signal is generated actively as a function of the original carrier frequency of the response signal.

7. The method as claimed in claim 6, wherein the base station which is arranged at the object and the portable code emitter each transmit and receive simultaneously.

8. The method as claimed in claim 6, wherein a distance of the code emitter from the base station is determined using the carrier frequencies, and access or use of the object is enabled only if both the distance of the code emitter lies within a predetermined range and the response signal is authorized by reference to its code information.

9. The method as claimed in claim 6, wherein the distance of the code emitter is determined by means of repeated phase difference measurements of the carrier frequencies.

10. The method as claimed in claim 6, wherein the two carrier frequencies are correlated with one another and adapted to one another by means of frequency shifting, as a result of which a phase difference is then measured by comparing the phases.

11. A system for measuring a distance between a first object and a second object using electromagnetic waves, said system comprising:

a first transceiver unit located in the first object, said unit emitting a first electromagnetic wave signal having a first carrier frequency, a second transceiver unit located in the second object, said second unit emitting a second electromagnetic wave signal having a second carrier frequency, wherein the first and second carrier frequencies are correlated such that the first carrier frequency is generated as a function of the second carrier frequency, or conversely the second carrier frequency is generated as a function of the first carrier frequency, and the distance between the objects is determined via a phase difference measurement or a frequency difference measurement between the signals received and generated in an object, and measurement accuracy is increased via repeated measurement at different carrier frequencies by calculating a difference between at least two measurement results from the phase difference measurement or frequency difference measurement.

* * * * *